United States Patent Office 3,394,304
Patented July 23, 1968

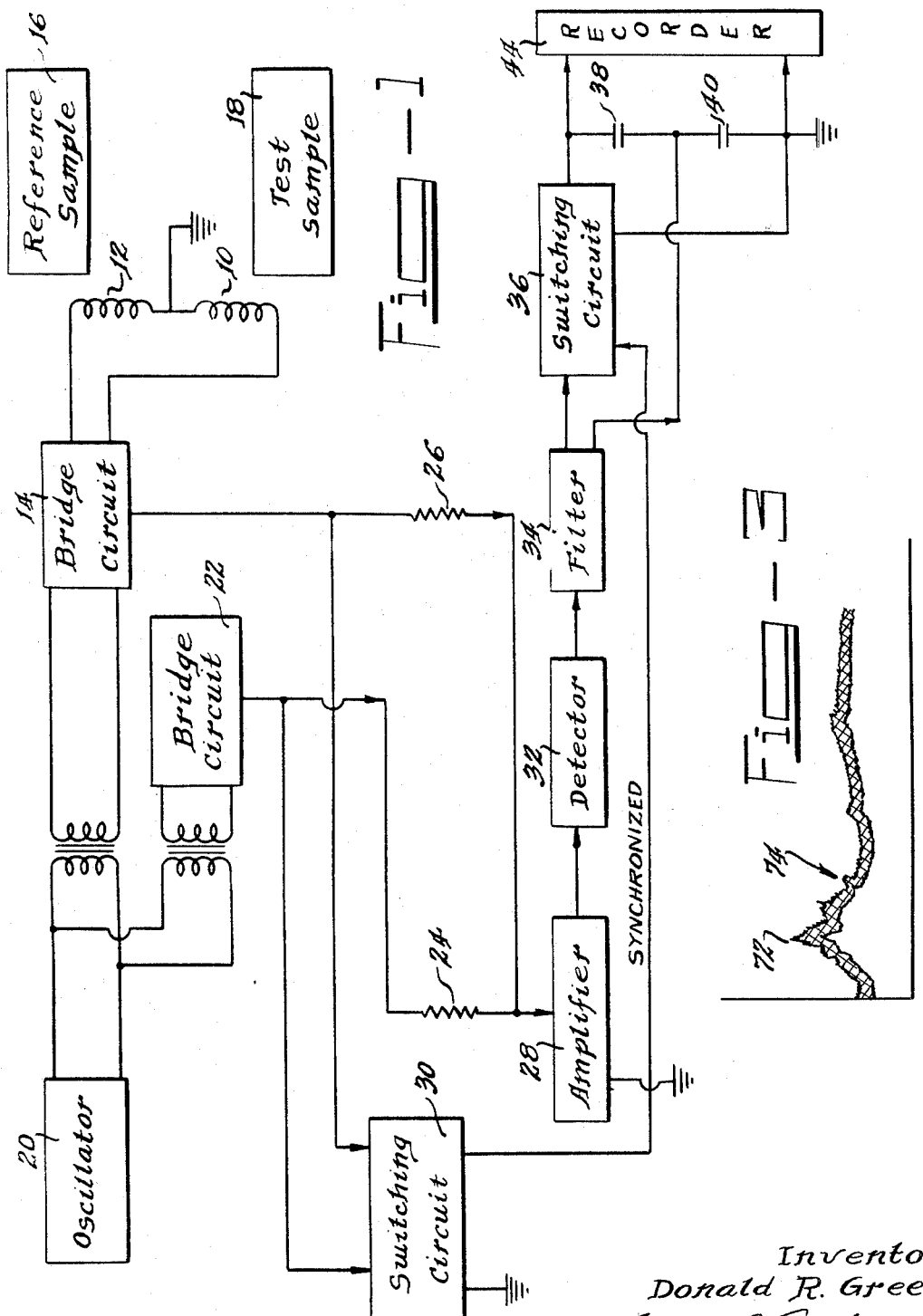

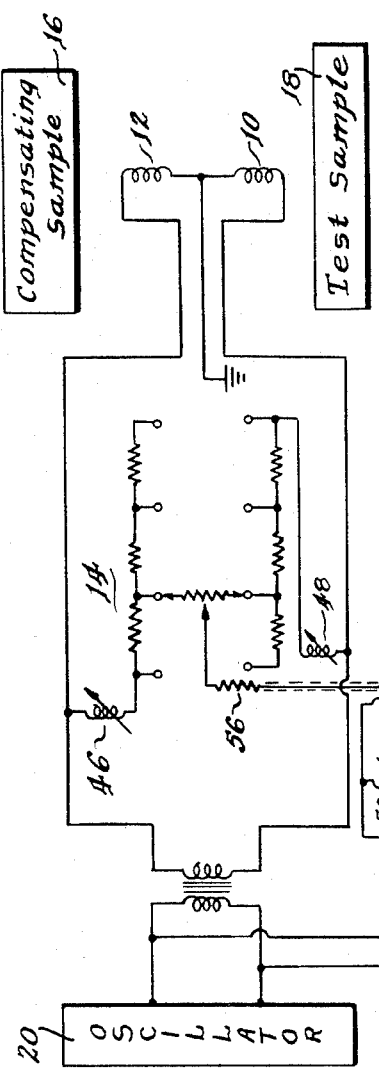

3,394,304
ULTRASTABLE EDDY CURRENT NONDE-
STRUCTIVE TESTING APPARATUS
Donald R. Green, Richland, Wash., assignor to the United
States of America as represented by the United States
Atomic Energy Commission
Filed Sept. 24, 1965, Ser. No. 490,146
6 Claims. (Cl. 324—40)

This invention relates to nondestructive eddy current testing devices and more particularly to ultrastable nondestructive eddy current testing devices. The invention described herein was made in the course of, or under, a contract with the U.S. Atomic Energy Commission.

In nondestructive testing it is sometimes necessary to measure small changes in sample parameters. In such cases, the stability of the measuring equipment becomes critical. Proper design techniques can result in stable electronic circuits, but the ultimate stability of many circuits is determined by stability of the vacuum tubes, transistors, diodes and other components. Environmental temperature can be regulated, but unpredictable drift of the component characteristics with time or unavoidable small temperature transients can still be a limiting factor in the final instrument stability.

One example wherein stable equipment is critical is in measuring small changes in resistivity. Zircaloy–2, a zirconium alloy containing by weight 1.46% tin, 0.124% iron, 0.10% chromium and 0.05% nickel, is commonly used in the nuclear energy industry. It is a material used in the manufacture of nuclear reactor components. Absorption of a small amount (a few hundred p.p.m.) of hydrogen in Zircaloy–2 is enough of an impurity to cause embrittlement thereof which can result in failure of any components manufactured therefrom. As may be readily appreciated, failure of nuclear reactor components is undesirable both for reasons of safety and cost. Absorption of 250 p.p.m. hydrogen by Zircaloy–2 results in a 0.4% increase in the resistivity thereof. Detection of this change in resistivity will give a measure of the hydriding of the Zircaloy–2.

It is therefore one object of the present invention to provide an ultrastable eddy current nondestructive testing apparatus.

It is another object of the present invention to provide an ultrastable eddy current nondestructive testing apparatus wherein variations in the active circuit elements of the apparatus do not practically affect the operation thereof.

It is another object of the present invention to provide an ultrastable eddy current nondestructive testing apparatus capable of detecting resistivity changes in Zircaloy–2 of 0.4% above the normal resistivity thereof.

It is yet another object of the present invention to provide an eddy current nondestructive testing apparatus capable of detecting a few hundred p.p.m. of hydride in zirconium.

Other objects of the present invention will become more apparent as the detailed description proceeds.

In general, the present invention comprises a first probe coil which is mounted adjacent a test sample, a reference test sample and a second like probe coil mounted adjacent the reference sample. The first and second probe coils are connected to form adjacent arms of a first bridge circuit. A second bridge circuit is used, with the first and second bridge circuits being initially adjusted to give equal amplitude outputs therefrom. Both bridge circuits are driven from a common oscillator. Means are provided for alternately connecting the outputs of the bridge circuits to the input of an amplifier and for converting the output of the amplifier to a D-C signal. First and second capacitors are provided. Means synchronized with the output alternately connecting means are provided for applying the D-C output signal from the converting means derived from the output of the first bridge circuit to the first capacitor to cause charging thereof. Means are also provided synchronized with the output alternately connecting means for applying the D-C output signal from said converting means derived from the output of the second bridge circuit to the second capacitor to cause charging thereof. Means are provided for differentially measuring the charge on the capacitors.

Further understanding of the present invention will best be obtained by consideration of the accompanying drawings wherein:

FIG. 1 is a schematic block diagram of an apparatus for the practice of the present invention.

FIG. 2 is a detailed schematic diagram of the embodiment of FIG. 1 used for the detection of hydriding in a test sample.

FIG. 3 is a graphical representation of the output of the apparatus of FIG. 2 showing the detection of hydriding in a test sample therewith.

Turning now to FIG. 1 wherein is shown a schematic diagram of an apparatus for the practice of the present invention, a probe coil 10 is connected to a compensating coil 12 and the combination incorporated into a bridge circuit 14. Compensating coil 12 is mounted adjacent a reference sample 16. The bridge circuit 14 is adjusted so that the output therefrom is referenced to the center of curvature of the probe-to-sample motion locus in the complex voltage plane plot thereof in accordance with the teachings by H. L. Libby, "Introduction to Eddy Current Methods and Techniques," Symposium on Nondestructive Tests in the Field of Nuclear Energy, ASTM Special Publication No. 223, April 1957, pages 13–28. Thus, changes in the spacing between probe coil 10 and a test sample 18 will produce a change in phase in the output of the bridge circuit 14. However, changes in the conductivity of the test sample 18 will cause the bridge output voltage to change in amplitude.

An oscillator 20 is coupled to bridge circuit 14 and to a reference bridge circuit 22. The outputs of bridge circuits 14 and 22 are connected via isolation resistors 24 and 26 to the input of A-C amplifiers 28. A switching circuit 30 is connected to alternately electrically ground the outputs from bridge circuits 14 and 18. Thus, the outputs from bridge circuits 14 and 18 are alternately presented to the input of A-C amplifier 28. The output from A-C amplifier 28 is capacitively coupled to a detector circuit 32. The output from detector circuit 32 is fed to a filter circuit 34 to remove therefrom high-frequency signals. A switching circuit 36, synchronized with switching circuit 30, is connected to alternately switch the output voltage from filter 34 across capacitors 38 and 40. The capacitors 38 and 40 are connected so that the charging thereof via switching circuit 36 is accomplished to give opposite polarities thereacross. Thus, capacitor 38 is charged when the short circuit ground is removed from the output of the reference bridge and capacitor 40 is charged when the short circuit ground is removed from the output of bridge circuit 14.

In the operation of the apparatus of FIG. 1, the bridge circuit output changes in phase responsive to probe-to-sample space variations and changes in amplitude responsive to changes in conductivity of the test sample 18. The compensating coil 12 primarily compensates for temperature changes which occur in the probe coil 10, the probe coil 10 and compensating coil 12 being connected in the bridge circuit 14 so that the outputs therefrom combine differentially. The bridge circuits 14 and 22 are initially adjusted so that the outputs therefrom are equal in amplitude. Reference bridge circuit 22, being supplied from the same oscillator 20 as bridge circuit 12, compensates for any changes in the oscillator output voltage, since any changes in the output of the oscillator 14 will be identically reflected in the inputs to the A-C amplifier 28 from the bridge circuits 14 and 22.

The switching circuit 30 is connected to alternately short to ground the output from the reference bridge circuit 22 and then the output from the bridge circuit 14. Thus, the output from only one bridge circuit at a time is permitted to enter the A-C amplifier 28. This switching procedure prevents stray capacitive coupling between the outputs of the bridge circuits 14 and 22 as well as preventing leakage through the output that is grounded. The amplifier 28 is a standard A-C amplifier and high stability is not required therein, since the amplifier is used to amplify both input signals from bridge circuits 14 and 22, thereby canceling the effect of any amplification variations. The output from the detector circuit 32 is a large D-C voltage which is relatively independent of probe-to-sample spacing variations and which varies in amplitude according to the resistivity changes within the sample 18. The filter circuit 34 shunts most high-frequency components from the output of the detector circuit 32. Without this filter, cross modulation between the chopper frequency and high-frequency components in the detector circuit output would occur. This would cause a low, variable frequency beat in the voltage at the input to the recorder 44. The D-C potential output of the filter 34 is applied alternately across capacitors 38 and 40 corresponding to the switching of the inputs to amplifier 28. The capacitors 38 and 40 are connected such that they are charged in opposite polarity during the switching operation. If the outputs from the bridge circuits 14 and 22 are equal in amplitude, the net voltage across the capacitors 38 and 40 will be zero.

The input resistance of the recorder 44 should be high enough so that the parallel time constant associated with the capacitors 38 and 40 is long compared to the period (or cycle) of switching of switching circuit 42 and the series time constant is much less than the period during which charging of a capacitor is accomplished. Thus, due to the short time constant of the capacitor circuit, the capacitors 38 and 40 will reach equilibrium in a time much shorter than the dwell time (or contact closure period) of the switching circuit 48, thereby permitting reasonably high rates of test sample scanning. Further, if the above time constants are followed, the output voltage to the recorder 44 will follow the output voltage from the filter 34 and will not be influenced by reasonable variations in the period of the switching circuit 42.

Turning now to FIG. 2, a detailed schematic diagram is shown for the embodiment of FIG. 1 for the detection of hydriding in Zircaloy-2. The compensating coil 10 had a value of 90 microhenries, as did the probe coil 12 with the test sample 18 in place. Each of the resistors (fixed and variable) in the bridge circuit 14 had a value of 50 ohms and the variable inductances 46 and 48 a value of 56 and 100 microhenries, respectively. In the reference bridge circuit 22, the variable inductors 50 and 52 had a value of 65 and 75 microhenries, respectively, and the variable resistor 500 ohms. The oscillator 20 operated at a frequency of 450 kc. In operation, the bridge circuit 14 was adjusted so that the output therefrom was referenced to the center of curvature of the probe-to-sample motion locus in the complex voltage plane plot thereof as hereinbefore described. Further, the reference bridge circuit 22 was adjusted so that the initial voltage output therefrom was equal in amplitude to the initial voltage output from the bridge circuit 14. The outputs from the bridge circuit 14 and reference bridge circuit 22 were connected via fixed resistors 54 and 56 and isolation resistors 58 and 60 to the input of amplifier 28. The fixed resistors 54 and 56 had a value of 12K ohms. The isolation resistors 58 and 60 each had a value of 12K ohms. A mechanical chopper 61 was used to alternately ground the outputs from bridge circuits 14 and 22, whereby the outputs from bridge circuits 14 and 22 were alternately presented to the input of amplifier 28. Small variations in the contact resistance of the contacts of chopper 61 have a negligible effect, since this resistance is negligible compared to the resistance of the input resistors 24 and 26.

The output of the amplifier 28 was capacatively coupled through a 750 picofarad capacitor 62 to a diode detector circuit 63. The diode detector circuit 63 comprised two 1N58 diodes. A filter capacitor 64 was connected across the output of diode detector circuit 63 to remove therefrom high-frequency signals and prevent cross modulation between the chopper frequency and high-frequency components in the diode detector circuit output. The filter capacitor 64 had a value of 400 picofarads. The output from capacitor filter 63 is fed to a resistor 65 having a value of 1K ohm. The voltage appearing across resistor 65 is alternately applied to capacitors 38 and 40 through a current-limiting resistor 66 by the contacts of a chopper 68 which is mechanically synchronized with the chopper 61. The current-limiting resistor 66 had a value of 1K ohm and capacitors 38 and 40 each had a value of 1 microfarad. A smoothing capacitor 70 was connected across capacitors 38 and 40 and the input of the high-impedance recorder 44. The smoothing capacitor 70 had a value of 1 microfarad. The choppers 61 and 68 were operated at a 60-cycle rate.

Reference is made to FIG. 3 wherein is shown the output signal of the apparatus of FIG. 2 as detected by recorder 44. The peak 72 on trace 74 shows the occurrence of hydriding in the test sample. The peak 72 is illustrative of a hydriding concentration of 275 p.p.m. in a Zircaloy-2 sample.

It is to be understood that, though mechanical choppers have been described, other switching devices may be used, such as solid-state switches.

Persons skilled in the art will, of course, readily adapt the general teachings of the invention to embodiments far different than the embodiments illustrated. Accordingly, the scope of the protection afforded the invention should not be limited to the particular embodiment illustrated in the drawings and described above, but should be determined only in accordance with the appended claims.

What is claimed is:

1. An ultrastable eddy current device for nondestructively testing a sample comprising a first probe coil mounted adjacent said test sample, a reference test sample, a second like probe coil mounted adjacent said reference sample, a first bridge circuit, means for connecting said first and second probe coils so that each forms an adjacent arm of said first bridge circuit, a second bridge circuit, said first and second bridge circuits being initially balanced to give equal amplitude outputs therefrom, an oscillator, means for connecting the output of said oscillator across the inputs of said first and second bridge circuits, an amplifier, means for alternately connecting the outputs of said bridge circuits to the input of said amplifier, means for converting the output of said amplifier to a D-C signal, first and second capacitors, means synchronized with said output alternate connecting means for applying the D-C output signal from said converting means derived from the output of said first bridge circuit to said first capacitor to cause charging thereof, means synchronized with said output alternate connecting means for applying the D-C output signal from said converting means derived from the output of said second bridge circuit to said second capacitor to cause charging thereof, and means for differentially measuring the charge on said capacitors.

2. The device according to claim 1 wherein said output alternate connecting means comprise first and second isolation resistors, means for connecting the output of said first bridge circuit through said first isolation resistor to the input of said amplifier, means for connecting the output of said second bridge circuit through said second isolation resistor to the input of said amplifier, and means for alternately shorting to ground potential the common terminals of said bridge circuits and said isolation resistors.

3. The device according to claim 1 wherein said means for applying said D-C output signal to said capacitors comprise first and second resistors connected in series, means for connecting one of said resistors across the output of said signal converting means, means for connecting said first capacitor across said first and second resistors responsive to the application of the output of said first bridge circuit to said amplifier, and means for connecting said second capacitor across said first and second resistors to cause said second capacitor to charge opposite in polarity to said first capacitor responsive to the application of the output of said second bridge circuit to said amplifier.

4. An ultrastable eddy current device for nondestructively testing a sample comprising a first probe coil mounted adjacent said test sample, a reference test sample, a second like probe coil mounted adjacent said reference sample, a first bridge circuit, means for connecting said first and second probe coils so that each forms an adjacent arm of said first bridge circuit, a second bridge circuit, said first and second bridge circuits being initially balanced to give equal amplitude outputs therefrom, an oscillator, means for connecting the output of said oscillator across the inputs of said first and second bridge circuits, an amplifier, first and second isolation resistors, means for connecting the output of said first bridge circuit to the input of said amplifier through said first isolation resistor, means for connecting the output of said second bridge circuit to the input of said amplifier through said second isolation resistor, first chopper means for alternately connecting the common terminals of said bridge circuits and said isolation resistors to ground potential, a diode detector circuit, capacitive means for coupling the output of said amplifier to the input of said diode detector circuit, means for filtering high frequencies from the output of said detector circuit, first and second resistors connected in series, means for connecting one of said resistors across the output of said filtering means, first and second capacitors, second chopper means synchronized with said first chopper means and connected to alternately connect said first and second capacitors across said series connected resistors to charge said capacitors opposite in polarity, a third capacitor connected across said first and second capacitors, and a recorder having the input thereof connected across said third capacitor.

5. The device according to claim 4 wherein said first and second chopping means are mechanical choppers mechanically synchronized with respect to each other, said recorder has an input resistance value and said first, second and third capacitors have a capacitive value to give a parallel time constant therefor greater than the switching cycle of said mechanical choppers, said recorder has an input resistance value and said first, second and third capacitors a capacitive value to give a series time constant therefor less than the contact closure period of said mechanical choppers.

6. An ultrastable eddy current device for nondestructively testing a sample comprising a first probe coil mounted adjacent said test sample, a reference test sample, a second like probe coil mounted adjacent said reference sample, a first bridge circuit, means for connecting said first and second probe coils so that each forms an adjacent arm of said first bridge circuit, a second bridge circuit, said first and second bridge circuits being initially balanced to give equal amplitude outputs therefrom, an oscillator, means for connecting the output of said oscillator across the inputs of said first and second bridge circuits, first and second isolation resistors, means for connecting the output of said first bridge circuit to the input of said amplifier through said first isolation resistor, means for connecting the output of said second bridge circuit to the input of said amplifier through said second isolation resistor, a first mechanical chopper having first and second contacts, means for connecting the common terminal between said first bridge circuit and said first isolation resistor to ground potential through the first contact of said first chopper, means for connecting the common terminal between said second bridge circuit and said second isolation resistor to ground potential through the second contact of said first chopper, means for actuating said chopper whereby the common terminals between said bridge circuits and said isolation resistors are alternately electrically grounded, a diode detector circuit, capacitive means for coupling the output of said amplifier to the input of said diode detector circuit, a 400 picofarad capacitor connected across the output of said detector circuit, first and second 1 kilohm resistors connected in series, means for connecting one of said resistors across said 400 picofarad capacitor, a second mechanical chopper having first and second contacts, means for synchronizing said first and second choppers, first and second 1 microfarad capacitors connected in series, means for connecting said first capacitor across said first and second resistors through the first contact of said second chopper, means for connecting said second capacitor across said first and second resistors through the second contact of said second chopper to charge said second capacitor opposite in polarity to said first capacitor, a third 1 microfarad capacitor connected across said first and second capacitors, and a recorder having an input resistance of approximately 80 kilohms connected across said third capacitor.

References Cited

UNITED STATES PATENTS 3,234,457   2/1966   Sower et al. _____ 324—40

RUDOLPH V. ROLINEC, *Primary Examiner.*

R. J. CORCORAN, *Assistant Examiner.*